United States Patent

[11] 3,632,389

| [72] | Inventor | Hargovind N. Vazirani<br>Stirling, N.J. |
|---|---|---|
| [21] | Appl. No. | 718,517 |
| [22] | Filed | Apr. 3, 1968 |
| [45] | Patented | Jan. 4, 1972 |
| [73] | Assignee | Bell Telephone Laboratories, Incorporated<br>Murray Hill, Berkeley Heights, N.J. |

[54] PROCESS FOR THE SURFACE TREATMENT OF COPPER AND ITS ALLOYS
11 Claims, 1 Drawing Fig.

[52] U.S. Cl.................................................. 117/49,
204/51, 204/141, 117/93, 117/132, 117/133,
117/135.1
[51] Int. Cl.................................................. B44d 1/34
[50] Field of Search........................................... 117/49, 93,
132, 133, 135.1; 204/51, 141

[56] References Cited
UNITED STATES PATENTS

| 2,206,064 | 7/1940 | Thompson | 117/49 |
|---|---|---|---|
| 2,377,229 | 5/1945 | Harford | 204/51 |
| 2,678,299 | 11/1954 | Geese et al. | 204/51 |
| 3,129,149 | 4/1964 | Johnson | 204/51 |
| 3,451,871 | 6/1969 | Bauer et al. | 117/49 |
| 3,454,474 | 7/1969 | Woods et al. | 204/51 |
| 3,475,295 | 10/1969 | Smith et al. | 204/51 |

*Primary Examiner*—Alfred L. Leavitt
*Assistant Examiner*—Janyce A. Bell
*Attorneys*—R. J. Guenther and Edwin B. Cave

ABSTRACT: Passing a current through the surface of copper and its alloys as a cathode while the surface is in contact with a solution containing chromate ions results in improved adhesion subsequently formed between the metal and organic materials.

PATENTED JAN 4 1972
3,632,389
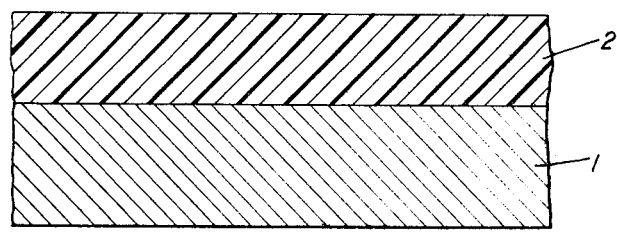
INVENTOR
H. N. VAZIRANI
BY
George S. Indig
ATTORNEY

PROCESS FOR THE SURFACE TREATMENT OF COPPER AND ITS ALLOYS

BACKGROUND OF THE INVENTION

1. Field of the Invention

This invention relates to surface treatment of copper and its alloys by cathodic treatment in a chromate ion-containing solution in order to improve adhesion between such surfaces and organic materials, and also relates to the joined product.

2. Description of the Prior Art

Coating of copper and its alloys and adhesive joining of copper and its alloys to both metals and nonmetals are common practice. Corrosion products ordinarily present on the surface of the metal interfere with such coating and joining, and have in the past been removed and replaced by a chemically produced oxide layer which prevents further corrosion and provides a surface suitable for joining.

Certain materials which are corrosive to this oxide layer are nevertheless necessary in some cases for use with copper as adhesives, coatings and potting compounds. For example, in the continuous formation of laminates for coaxial cables a solid flexible sheet of carboxyl-olefin polymer adhesive is desirable because it can be fed continuously into the laminate (examples of such laminates are copper joined to steel which are described in U.S. Pat. Nos. 3,206,541 and 3,233,036) from a roll and bonded by heat and pressure without the necessity of curing. Due to the corrosive nature of the polymer, however, the resulting joints often degrade with time to such an extent that the use of the polymer is impractical.

SUMMARY OF THE INVENTION

This invention is essentially a joining technique in which the surface of copper and its alloys is treated cathodically with a chromate ion-containing solution prior to joining and results in joints which resist degradation resulting from the corrosive action of certain organic materials.

Since the surface to be treated ordinarily contains contaminants such as dirt, grease and corrosion products, it is usually necessary to remove these prior to the surface treatment and to aid the practitioner, exemplary procedures are briefly described.

Furthermore, since the treatment is essentially one to prepare the surface of copper and its alloys for joining to an organic material, joints to dissimilar metals as well as to similar metals and joints to nonmetals by means of an organic material are contemplated.

BRIEF DESCRIPTION OF THE DRAWING

The FIGURE is a cross-sectional view of a laminate formed according to the inventive process.

DETAILED DESCRIPTION

This process applies to copper and any of its alloys containing at least 50 percent copper, and has as its principal object the removal of dirt and corrosion products from the metal surface and replacement with a chromate layer. Since an object of the cathodic treatment is to reduce oxide scale, thus exposing the metal surface to the chromate ion-containing solution, any advantage to be gained by preliminary cleaning of the metal surface will reside in the reduced rate of contamination of the chromate solution, replacement of which may be both costly and time consuming.

Preliminary cleaning is by methods well known in the art. Thus, the following description of preliminary cleaning is intended to be exemplary and not limiting.

Preliminary cleaning is generally divided into degreasing and descaling. For example, degreasing is generally effective in removing only oils and grease and is ineffective in removing corrosion products such as naturally formed oxide scale. Descaling, which may be either mechanical or chemical, will, however, generally remove substantially all of the surface contamination. However, descaling chemically without first degreasing may result in rapid contamination of the solution.

Removal of oils and grease may be accomplished by the use of organic solvents such as alcohols, ketones and chlorinated solvents such as trichlorethylene and perchlorethylene. Such removal may also be accomplished by use of alkaline cleaners. Commonly used components of such cleaning mixtures are: sodium hydroxide, used for its saponifying power; phosphates and silicates, used for their emulsifying and wetting abilities; surface active agents such as alkyl aryl polyether alcohols, used for their wetting ability; and detergents, used for their wetting and saponifying ability.

An example of an effective alkaline cleaning solution is one which contains from 1 to 10 percent by weight sodium metasilicate, from 1 to 10 percent trisodium phosphate and from 1 to 10 percent of an alkyl aryl polyether alcohol, remainder water. Cleaning in this solution may be carried out from from 1 to 30 minutes at a temperature of from 70° to 180° F.

Descaling is usually accomplished by the use of acid solutions or by mechanical abrasion. The particular method chosen for descaling will depend on the thickness, composition and character of the scale, which depends upon the composition and character of the scale, which depends upon the composition of the metal and upon its history, particularly its thermal history.

The usual practice is to use an aqueous solution containing from 1 to 10 percent by weight of nitric acid, immersing the metal therein at a temperature of from 70° to 150° F. for from 1 to 30 minutes. However, such a treatment is often ineffective in removal of the scale. It is thus preferred to add phosphoric acid to this solution, to increase the acidity of the solution. Such a solution contains up to 80 percent by weight phosphoric acid, up to 40 percent by weight nitric acid, remainder at less 20 percent water, and is used within the same temperature range as is the nitric acid solution.

Too high a concentration of nitric acid attacks the surface too rapidly, taking away substantial amounts of pure metal. Too high a concentration of phosphoric acid or too low a concentration of nitric acid results in the solution becoming less effective against severe contamination and requires excessively long cleaning times for moderate surface contamination.

Phosphoric acid may also be used to contribute to the formation of a smooth and bright surface, if it is present in amounts above about 40 percent by weight of the solution, within the ranges already specified.

Examples of mechanical abrasion methods for descaling are abrasive blasting, wire brushing, and grinding. In general, these methods are more wasteful of metal and produce surfaces somewhat rougher textured than do solution methods. However, rough surfaces are particularly advantageous for increased peel strength of subsequently formed joints. Sandblasting is often used for this reason. In operation, grit or sand which passes a standard screen from No. 150 to 500 is introduced into an air stream at pressures of 25 to about 100 pounds per square inch and the blast directed over the surface of the metal until the scale is removed.

A rough surface may also be achieved chemically of course, as for example, by adjusting the concentration of an acid pickling bath to a high concentration of nitric acid within the ranges described or by using a chemical etching solution containing for example hydrochloric acid and either ferric chloride or cupric chloride each in the amounts of from 1 to 10 percent by weight.

A more complete description of degreasing and descaling methods may be found in *Protective Coatings for metals*, Third Edition, American Chemical Society, Monograph 163 by R. M. Burns and W. W. Bradley, pages 27 to 54, Reinhold (1967).

Once the removal of surface contamination has been effected, the clean metal surface should be either treated with chromate solution promptly or stored under noncorrosive conditions until treatment in order to realize any advantage gained, since exposure of the clean surface to a nonprotective atmosphere will soon result in reformation of corrosion products.

The concentration of chromate ions in the solution is not critical and may range from 0.001 percent by weight to saturation. The ions may be introduced in combination with the Group I alkali metals; lithium, sodium, potassium, rubidium and cesium or the Group II alkaline earth metals; beryllium, magnesium, calcium, strontium and barium. It is essential that the solution have a pH of at least 4 in order to minimize the formation of chromic acid in the solution, which would tend to dissolve the formed surface. A pH of from 8 to 10 is preferred for this purpose.

Alkalinity may be achieved by using any compound which will yield hydroxyl ions in solution as, for example, the Group I and Group II metal phosphates, hydroxides and carbonates. It is preferable to select a compound which will act as a buffer in order to insure that the reaction proceeds uniformly. A further advantage may be gained by adding to the solution a compound which will form a complex with copper ions in solution, as for example, the Group I and Group II metal citrates, tartrates, oxalates and gluconates. Such complexing prevents the possibility of interference of free copper ions with the formation of the chromate layer. The amount of the complexing agent may range from 0.001 percent by weight to saturation. The presence of this complexing agent in solution will ordinarily result in a pH of from 7 to 10, so that a separate alkalizing agent is unnecessary. Such complexing agent also gives some beneficial buffering action.

A preferred embodiment of the treatment of the metal surface comprises inserting the metal and some other suitable electrode material into the solution, and applying a voltage so that the metal is treated cathodically. A voltage of from 1 to 20 is required, below which range the voltage is insufficient to reduce the oxide scale on the metal surface and above which range gassing of hydrogen becomes excessive, thus interfering with the formation of a suitable surface. Within this range, a voltage of from 2 to 6 is preferred for optimum results. The oxide scale will ordinarily be removed within 10 seconds, but can be substantially removed within 1 second. However, it is preferred to continue passage of current for from ½ to 1 minute in order to minimize the possibility of not reducing all the oxide from recessed parts. The formation of the chromate layer is self-limiting so that excessive treatment times will not substantially impair the final result.

The following examples compare adhesive joint strengths obtained by cathodic treatment in chromate solution and by chemical and precleaning treatments.

EXAMPLE 1

Three sets of T-peel joints were made from soft copper 0.032 inch thick, and 1 inch wide and two acrylic acid-ethylene copolymers are per ASTM procedure D1876–61T. All the specimens were vapor degreased. Sets 2 and 3 were then acid etched in a solution containing phosphoric acid, nitric acid and water in the amounts of 75 percent, 10 percent and 15 percent by weight, respectively, for one-half minute, followed by rinsing with distilled water. Set 2 was then contacted with a chlorite ion-containing solution for 2 minutes at 205° F. Set 3 was treated cathodically at 3 volts for 3 minutes in a room-temperature solution containing 3 percent by weight each of sodium chromate, sodium carbonate and sodium citrate. Each set was then rinsed with distilled water and air dried at room temperature and joined. The sets were then measured for T-peel strength according to ASTM procedure D187–61bT. The results for each copolymer are shown in tables 1A and 1B, respectively.

TABLE 1A.—POLYMER NO. 1

| | Set No. | | |
|---|---|---|---|
| | 1 | 2 | 3 |
| T-peel strength after aging of the joint for 1 day at room temperature (inch-pounds per inch width) | 4.8 | 9.0 | 20.0 |
| T-peel strength after aging of the joint for 6 days at room temperature and 15 days at 160° F. and 95% R.H. | 0.7 | 2.0 | 18.0 |

TABLE 1B.—POLYMER NO. 2

| | Set No. | | |
|---|---|---|---|
| | 1 | 2 | 3 |
| T-peel strength after aging of the joint for 1 day at room temperature | 2.4 | | 13.5 |
| T-peel strength after aging of the joint for 4 days at 160° F. and 95% R.H. | | | 10.6 |

EXAMPLE 2

Three sets of standard ½-inch lap joints were made from Muntz metal, (60 percent copper 40 percent zinc) and epoxy resin as per ASTM procedure D1002. The specimens were vapor degreased with trichlorethylene. Sets 2 and 3 were then acid etched as in example 1. Set 2 was treated with a chlorite solution for 2 minutes at 205° F. Set 3 was treated cathodically at 4 ½ volts in a solution containing 3 percent each of sodium chromate, sodium carbonate and sodium citrate for 1 minute. Each set was then rinsed with distilled water, air dried and joined. The sets were then measured for tensile shear strength according to ASTM procedure D1,002. Permanence was also measured by observing the time to failure when a static load was applied for six specimens in an ambient atmosphere of 95° F. at 90 percent relative humidity. Results are shown in table 2.

TABLE 2

| | Set No. | | |
|---|---|---|---|
| | 1 | 2 | 3 |
| Average tensile shear (p.s.i.) | 1,790 | 1,900 | 2,480 |
| Days to failure (static load of 800 p.s.i.) | 2 | ¹ ² >48 | ² >125 |

¹ ² Four of the six joints failed.
² Test discontinued after 125 days.

EXAMPLE 3

Two sets of standard ½-inch lap joints were made from a copper alloy containing 65 percent copper, 18 percent nickel and 17 percent zinc, and epoxy resin as per ASTM procedure D1002. The specimens were vapor degreased with trichlorethylene. Set 2 was then treated with alkaline cleaner for 5 minutes at 130° F., rinsed with distilled water and treated cathodically at 4 ½ volts in a solution containing 3 percent each of sodium chromate, sodium carbonate and sodium citrate for 1 minute. Chlorite-treated samples were omitted due to the corrosive action of chlorite towards zinc. Each set was air dried and joined.

The sets were then measured for tensile shear strength according to ASTM procedure D1002. Permanence was also measured by observing the time to failure when a static load was applied for six specimens in an ambient atmosphere of 95° F. at 90 percent relative humidity. Results are shown in table 3.

TABLE 3

| | Set No. | |
|---|---|---|
| | 1 | 2 |
| Average tensile shear (p.s.i.) | 3,580 | 5,420 |
| Days to failure (static load of 4,000 p.s.i.) | <1 | 31 |
| Static load of 3,500 p.s.i. | <1 | 42 |

As may be seen from the above examples, durable joints under static loading are obtainable by cathodic treatment in chromate solution prior to joining.

Referring now to the drawing, there is shown a bonded product prepared in accordance with the inventive process. Shown in the figure is a copper or copper alloy body 1, joined to an organic body 2.

While the invention has been described in terms of improving joints between copper and its alloys and organic materials corrosive thereto, it is, of course, not so limited, but applies also to improving joints noncorrosive organics, including adhesives, coatings and potting compounds. Examples of adhesive materials are epoxies and modified epoxy resins, nitrile rubber phenolics, polyvinyl butyrals and polyvinyl formals. Examples of coating materials are alkyds and modified alkyds, acrylics, polyesters and urethanes. Potting compounds include polyurethanes, silicones and epoxies. Other embodiments of the invention which basically rely on the teachings of the invention as described herein are to be considered as within the scope of the invention and the appended claims.

I claim:

1. A method for joining a surface consisting of a copper alloy containing at least 50 percent by weight copper to an organic material, said organic material being selected from the group consisting of carboxyl-olefin polymers, epoxies, nitrile rubber phenolics, polyvinal butyrals, polyvinal formals, alkyds, acrylics, polyesters, urethanes, polyurethanes and silicones, characterized in that said joining is preceded by the step of passing a current through said surface as a cathode while said surface is in contact with a solution containing chromate ions and having a pH of at least 4.

2. The method of claim 1 in which said solution contains chromate ions in the amount of from 0.001 percent by weight to saturation.

3. The method of claim 1 in which said current is passed through said surface at a voltage of from 1 to 20 volts for a time of at least 1 second.

4. The method of claim 3 in which said current is passed through said surface at a voltage of from 2 to 6 volts for a time of from 30 to 60 seconds.

5. The method of claim 1 in which said solution contains a compound of a member selected from the group consisting of citrates, tartrates, oxalates and gluconates and ions of an element selected from Groups I and II of the periodic table.

6. The method of claim 1 in which said chromate ions are introduced into said solution as a compound of an element selected from Groups I AND II of the periodic table.

7. The method of claim 1 in which the step of contacting said surface as a cathode with said solution is preceded by descaling.

8. The method of claim 1 in which the step of contacting said surface as a cathode with said solution is following by joining said surface to an organic polymer selected from the group consisting of carboxyl-olefin epoxies, nitrile rubber phenolics, polyvinyl butyrals, polyvinyl formals, alkyds, acrylics, polyesters, polyurethanes and silicones.

9. The method of claim 8 in which said organic polymer is a carboxyl-olefin polymer.

10. The method if claim 1 in which the solution has a pH of from 8 to 10.

11. The product produced by the method of claim 1.

* * * * *